United States Patent
Chen et al.

(10) Patent No.: US 8,107,373 B2
(45) Date of Patent: Jan. 31, 2012

(54) METHOD, DEVICE AND SYSTEM FOR REALIZING QOS GUARANTEE IN A MPLS NETWORK

(75) Inventors: Dan Chen, Shenzhen (CN); Zhongsheng Luo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 703 days.

(21) Appl. No.: 10/580,401

(22) PCT Filed: Nov. 24, 2003

(86) PCT No.: PCT/CN03/00996
§ 371 (c)(1),
(2), (4) Date: Mar. 13, 2007

(87) PCT Pub. No.: WO2005/050927
PCT Pub. Date: Jun. 2, 2005

(65) Prior Publication Data
US 2007/0268909 A1    Nov. 22, 2007

(51) Int. Cl.
*G01R 31/08* (2006.01)
(52) U.S. Cl. ........................ 370/231; 370/468
(58) Field of Classification Search ............... 370/395.2, 370/395.5, 252, 231, 232, 233, 235, 236.1, 370/468
See application file for complete search history.

(56) References Cited

U.S. PATENT DOCUMENTS

| | | | | |
|---|---|---|---|---|
| 6,108,304 A | * | 8/2000 | Abe et al. | 370/232 |
| 7,047,316 B2 | * | 5/2006 | Iwata et al. | 709/240 |
| 7,184,434 B2 | * | 2/2007 | Ganti et al. | 370/389 |
| 7,215,640 B2 | * | 5/2007 | Matsubara | 370/235 |
| 7,477,657 B1 | * | 1/2009 | Murphy et al. | 370/468 |
| 2002/0059432 A1 | * | 5/2002 | Masuda et al. | 709/227 |
| 2002/0181401 A1 | | 12/2002 | Hagirahim et al. | |
| 2003/0076829 A1 | * | 4/2003 | Rabie et al. | 370/391 |
| 2003/0084089 A1 | * | 5/2003 | Kurose et al. | 709/200 |
| 2004/0202159 A1 | * | 10/2004 | Matsubara et al. | 370/389 |
| 2006/0182119 A1 | * | 8/2006 | Li et al. | 370/395.52 |
| 2006/0182127 A1 | * | 8/2006 | Park | 370/400 |

FOREIGN PATENT DOCUMENTS

| | | |
|---|---|---|
| CN | A 1412985 | 4/2003 |
| EP | 1202501 | 5/2002 |
| GB | 2317308 | 3/1998 |
| WO | 00/36871 | 6/2000 |

OTHER PUBLICATIONS

World Telecommunications, No. 0, 2002, Xue Guofeng "IP QoS Solution", p. 34-p. 38.

(Continued)

*Primary Examiner* — Aung S Moe
*Assistant Examiner* — Awet Haile
(74) *Attorney, Agent, or Firm* — Michael Best & Friedrich LLP

(57) ABSTRACT

A method for realizing QoS guarantee in a MPLS network, a method for establishing a QoS data path, a method for terminating QoS data transmission, an edge router for a MPLS network and a MPLS network for realizing QoS guarantee are provided. The method for realizing QoS guarantee in a MPLS network includes: creating individual QoS resource list in each edge router to record resource state corresponding to a path; the each edge router assigning resources to a user terminal which makes a request based on the QoS resource list and updating the QoS resource list.

14 Claims, 7 Drawing Sheets

OTHER PUBLICATIONS

Modern Computer, No. 3, 2002, Li Xinying et al "Flux Control and QoS Realize of MPLS Technology", p. 20-p. 28.

World Telecommunications, No. 0, 2002, Xue Guofeng "IP QoS Solution", p. 34-p. 38.(English Abstract enclosed).

Modern Computer, No. 3, 2002, Li Xinying et al "Flux Control and QoS Realize of MPLs Technology", p. 20-p. 28. (English Abstract enclosed).

* cited by examiner

METHOD, DEVICE AND SYSTEM FOR REALIZING QOS GUARANTEE IN A MPLS NETWORK

This application is a National Stage application of co-pending PCT application PCT/CN2003/000996 filed Nov. 24, 2003, which was published in Chinese under PCT Article 21(2) on Jun. 6, 2005. The application is incorporated herein by reference in its entirety.

TECHNICAL FIELD OF THE INVENTION

The present invention relates to a mechanism for realizing QoS guarantee in a network, especially to the mechanism for realizing QoS guarantee in a MPLS network.

BACKGROUND OF THE INVENTION

QoS (Quality of Service) is a key problem to be solved urgently in the next generation networks. In the trend of convergence in the next generation network, an IP network will become a unified transport platform for carrying voice, data and video. Since the IP network adopts connectionless-oriented IP protocols and can only provide the best-effort service, the QoS guarantee can not be provided.

QoS means network performance related to the application requirements and certain techniques for guaranteeing the network performance. At present, several mechanisms for realizing QoS guarantee have been proposed.

An IntServ/RSVP (Integrated Service/Resource Reservation Protocol) Model

The RSVP protocol is used to establish resource reservation in an integrated service network. A user terminal sends a QoS request for an application stream to the network using the RSVP protocol. A router receiving the QoS request determines a path of the application stream, transmits the information of the QoS request to other routers in the path, establishes and saves the service information and reserves certain resources for the application stream. The resource reservation is to reserve certain resources for the application stream along the path of the application stream from source end to receiving end. Though this service model can provide absolute QoS guarantee, it has a relatively high requirement which requires the router to support the RSVP protocol and an admission control protocol. The service model also needs to spend a lot of resources to maintain and update databases. It is complicated to implement the model so that the network using the model has poor expansibility.

A DiffServ (Differentiated Service) Model

The basic idea of the DiffServ Model is to mark a Differentiated Service Code Point (DSCP) for a data packet at an entrance of the network to indicate how the data packet is processed at the intermediate node of the forwarding path in the network. Some different service levels can be formed by setting different mark for a DSCP field of the data packet and the processing based on the DSCP field. Thus, at an entrance of a Service Provider's network, an edge router can performs operations such as classifying, marking, policing, etc. The main task of the core network is only to take corresponding actions to forward the data packet, and assign routes to the data packet, based on the DSCP mark in the head of the data packet. Detailed DiffServ mechanism is described in RFC 2475. This DiffServ mechanism is easy to be implemented, that is, it only requires mapping the service request to DSCP at the edge of the network, without taking explicit resource reservation signaling at the core node of the network, thereby decreasing the complexity. However, this model cannot provide absolute guarantee for each stream to have sufficient resources because it has no access control and signaling mechanism.

A MPLS (Multi-Protocol Label Switching) Technique

MPLS is a switching technique combining layer 2 and layer 3, which cannot solve the QoS problem itself but can assist to solve the QoS problem. A label-based mechanism is introduced by MPLS, which decouples route selection from data forwarding and defines a path of a packet passing the network with labels. A MPLS network is composed of a Label Switching Router (LSR) in the core and a Label Edge Routers (LER) in the edge. The function of a LSR can be considered as a combination of an ATM switch and a traditional router, being composed of a control unit and a switching unit. The function of a LER is to analyze an IP packet head to determine corresponding transport level and a label switching path (LSP). MPLS supports the DiffServ Model, being able to map a plurality of BAs (Behavior Aggregation) of the DiffServ to one LSP of MPLS and forward the traffic on the LSP based on the PHB (Per-Hop-Behavior) of the BAs. However, the combination of MPLS and DiffServ is only limited in the processing manner of data plane, it cannot guarantee the QoS of the data stream entering the network.

SUMMARY OF THE INVENTION

In order to solve above-mentioned problems in the prior art, according to an aspect of the present invention, there is provided with a method for realizing QoS guarantee in a MPLS network, including: creating individual QoS resource list in each edge router to record resource state corresponding to a path; the each edge router assigning resources to a user terminal which makes a request according to the QoS resource list and updating the QoS resource list.

According to another aspect of the present invention, there is provided with a method for establishing a QoS data path in a MPLS network, including: a user terminal sending a QoS resource request to an ingress edge router; the ingress edge router determining a route path to an egress edge router based on route information in the resource request; the ingress edge router determining whether the user' resource request is accessed or rejected according to resource state corresponding to that path recorded in its QoS resource list; and the ingress edge router updating the QoS resource list when the resource request is determined to be accessed.

According to still another aspect of the present invention, there is provided with a method for terminating QoS data transmission in a MPLS network, including: an ingress edge router receiving a resource releasing request from a user terminal; the ingress edge router releasing resources occupied by the user terminal; and the ingress edge router modifying its QoS resource list which records resource state corresponding to a path.

According to still another aspect of the present invention, there is provided with an edge router for a MPLS network, including: a QoS resource list for recording resource state corresponding to a path; and an access and resource control unit for accessing or rejecting a resource request from a user terminal according to information recorded in the QoS resource list and updating the QoS resource list.

According to still another aspect of the present invention, there is provided with a MPLS network for realizing QoS guarantee, including: an above-mentioned edge router.

BRIEF DESCRIPTION OF THE DRAWINGS

It is believed that above-mentioned features, advantages and objects of the present invention will be better understood through following description of the embodiments of the invention, taken in conjunction with the drawings, in which.

DETAILED DESCRIPTION OF THE INVENTION

Next, in conjunction with the drawings, a detailed description will be given to the preferred embodiments of the present invention.

A Method for Realizing QoS Guarantee in a MPLS Network

Figure 1:
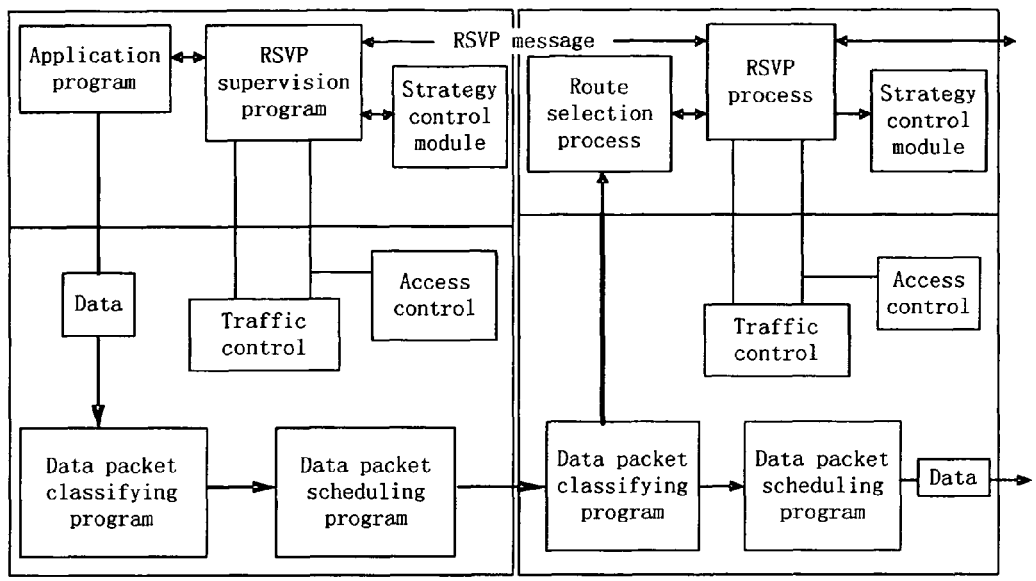
FIG. 1 is a schematic diagram of the IntServ/RSVP model for realizing QoS guarantee.
Figure 2:
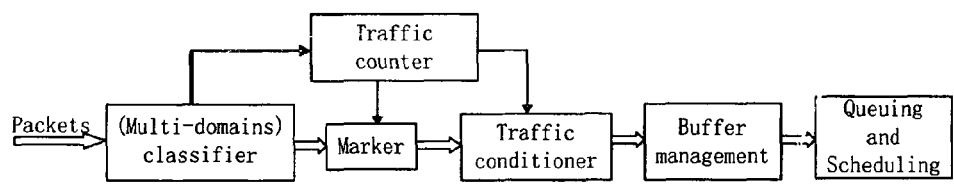
FIG. 2 is a schematic diagram of the DiffServ model for realizing QoS guarantee.
Figure 3:
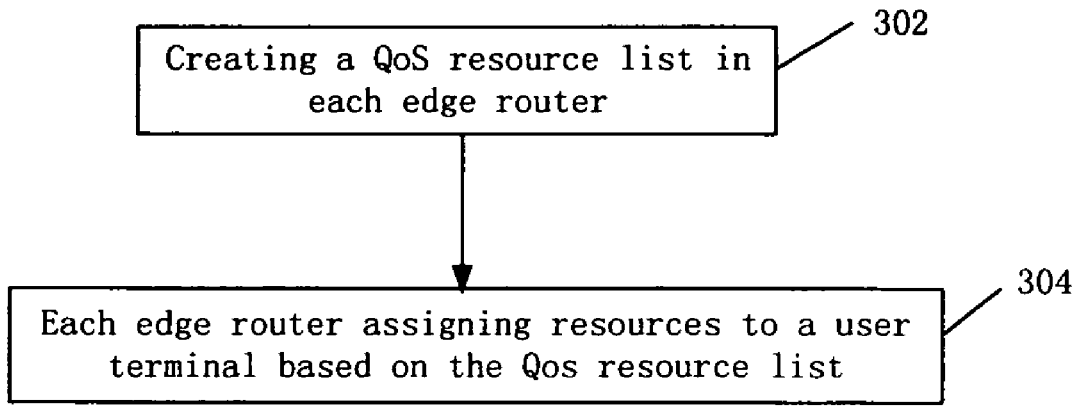
FIG. 3 is a flowchart showing a method for realizing QoS guarantee in a MPLS network according to an embodiment of the present invention.

FIG. 3 is a flowchart showing a method for realizing QoS guarantee in a MPLS network according to an embodiment of the present invention. As shown in FIG. 3, first in step 302, individual QoS resource list is created in each edge router to record resource state corresponding to a path. Specifically, based on pre-configured LSP resource information, each edge router in the MPLS network creates a resource list for QoS access control, in which list resource information of the paths in the whole MPLS network are saved.

In this embodiment, the resource states of the paths from the edge router to all the other edge routers in same domain are recorded in the QoS resource list. If there are N edge routers in the domain, the resource states of the paths from the edge router to the other N−1 edge routers are saved in the resource list of each router.

In this embodiment, a field structure of the QoS resource list may be as follows:

Egress Edge Router; Service Class; LSP Resources; Available Resources

As shown in above field structure of the QoS resource list, the resource information of N−1 paths need to be saved in each edge router. This information can be derived from LSP information on border routers. Specifically, the process of creating the QoS resource list is shown in FIG. 4.

Figure 4:
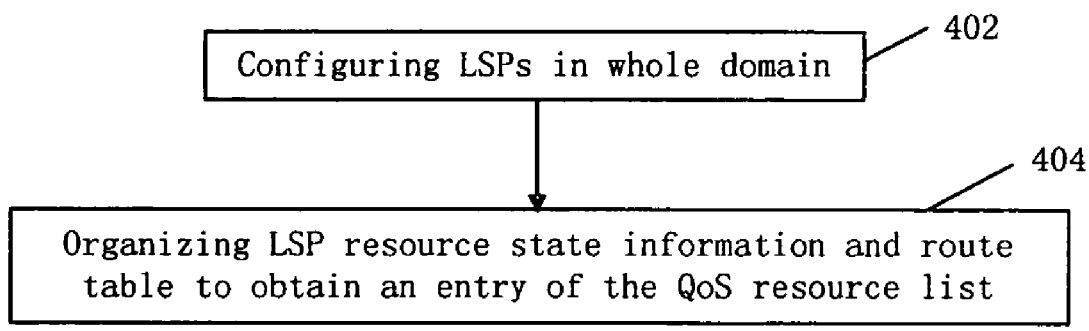
FIG. 4 is a flowchart further showing the step of creating a QoS resource list in the method for realizing QoS guarantee in a MPLS network according to an embodiment of the present invention.

FIG. 4 is a flowchart further showing the step of creating a QoS resource list in the method for realizing QoS guarantee in a MPLS network according to an embodiment of the present invention. As shown in FIG. 4, in step 402, LSPs are configured first. Specifically, the LSPs are configured in the whole domain. Different service classes, such as audio, video, or data, are made to have different priorities respectively. A network operator can set different LSP for each class to form a LSP resource state list in the MPLS network. Then in step 404, LSP resource state information and route information are organized. Specifically, based on the LSP resource state information and route information of the MPLS network, each edge router obtains the resource information of the path from the router to each of the other edge routers in the same domain, and saves the resource information in the QoS resource list for providing decision basis for controlling resource assignment later.

Returning to FIG. 3, in step 304, each edge router assigns resources to a user terminal which makes a request based on the QoS resource list, and updates the QoS resource list. Specifically, after receiving a resource request from the user terminal, the edge router determines a path requested by the user terminal and an egress edge router of the path, and then searches the QoS resource list for current available information of the path. If the current available resources of the path are larger than the bandwidth resources requested by the user terminal, the user terminal is allowed to access the network; otherwise the user terminal is rejected. In this embodiment, the specific process of assigning resources to the user terminal is shown in FIG. 5.

Figure 5:
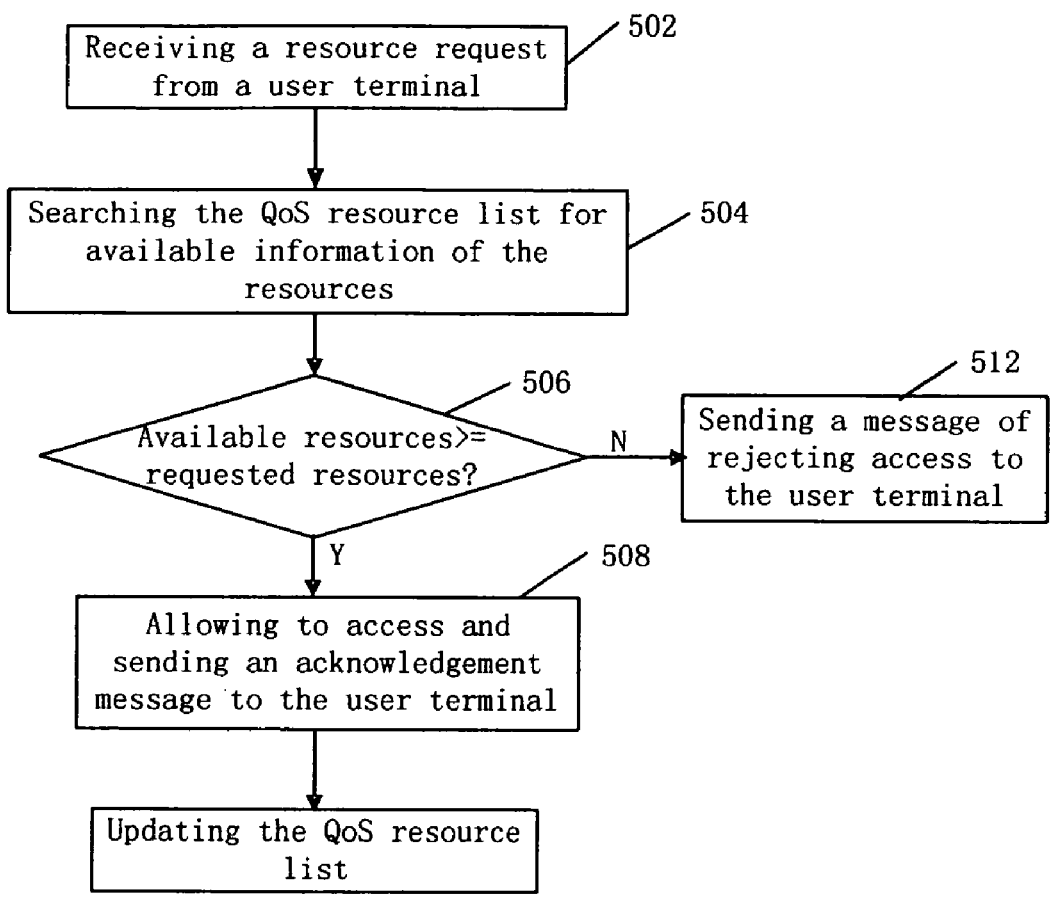
FIG. 5 is a flowchart further showing the step of assigning resources to a user terminal which makes a request in the method for realizing QoS guarantee in a MPLS network according to an embodiment of the present invention.

FIG. 5 is a flowchart further showing the step of assigning resources to a user terminal which makes a request in the method for realizing QoS guarantee in a MPLS network according to an embodiment of the present invention. In step 502, the edge router receives the resource request from the user terminal. Specifically, the user terminal sends a QoS signaling to a network device for requesting QoS resources through QoS API. The resource request carries the required service class and resource request, wherein a method for expressing the priority of the service class is predetermined between a network operator and the user terminal and between network operators.

In step 504, based on the egress edge router in the resource request, the edge router searches the QoS resource list for available information of the requested resources. After receiving the resource request, the edge router obtains a destination IP address carried in the resource request to determine an edge router through which the path leaves the domain, whereby determining the egress edge router. Then the edge router searches the QoS resource list for the current resource state of the path based on the egress edge router to obtain the available bandwidth resources BW of the path.

In step 506, the edge router determines whether the resource request is accessed or rejected based on the available information of the requested resources. The available bandwidth resources BW of the path are compared with the bandwidth resources BWRequest requested in the resource request to determine whether the available bandwidth resources are larger than or equal to the requested bandwidth resources. If the result in step 506 is that the available bandwidth resources are larger than or equal to the requested bandwidth resources, the process proceeds to step 508.

In step 508, the resource request from the user terminal is allowed to be accessed, and an acknowledgement message of allowing access is sent to the user terminal. In step 510, the available information of the requested resources in the QoS resource list is modified. Specifically, the bandwidth resources requested in the resource request are subtracted from the available resources of the path in the QoS resource list, that is, the available bandwidth resources BW=the available bandwidth resources BW−the requested bandwidth resources BWRequest.

If the result in step 506 is "No", the process proceeds to step 512, where a message of rejecting access is sent to the user terminal which requests the resources.

A Method for Establishing a QoS Data Path in a MPLS Network

Figure 6:
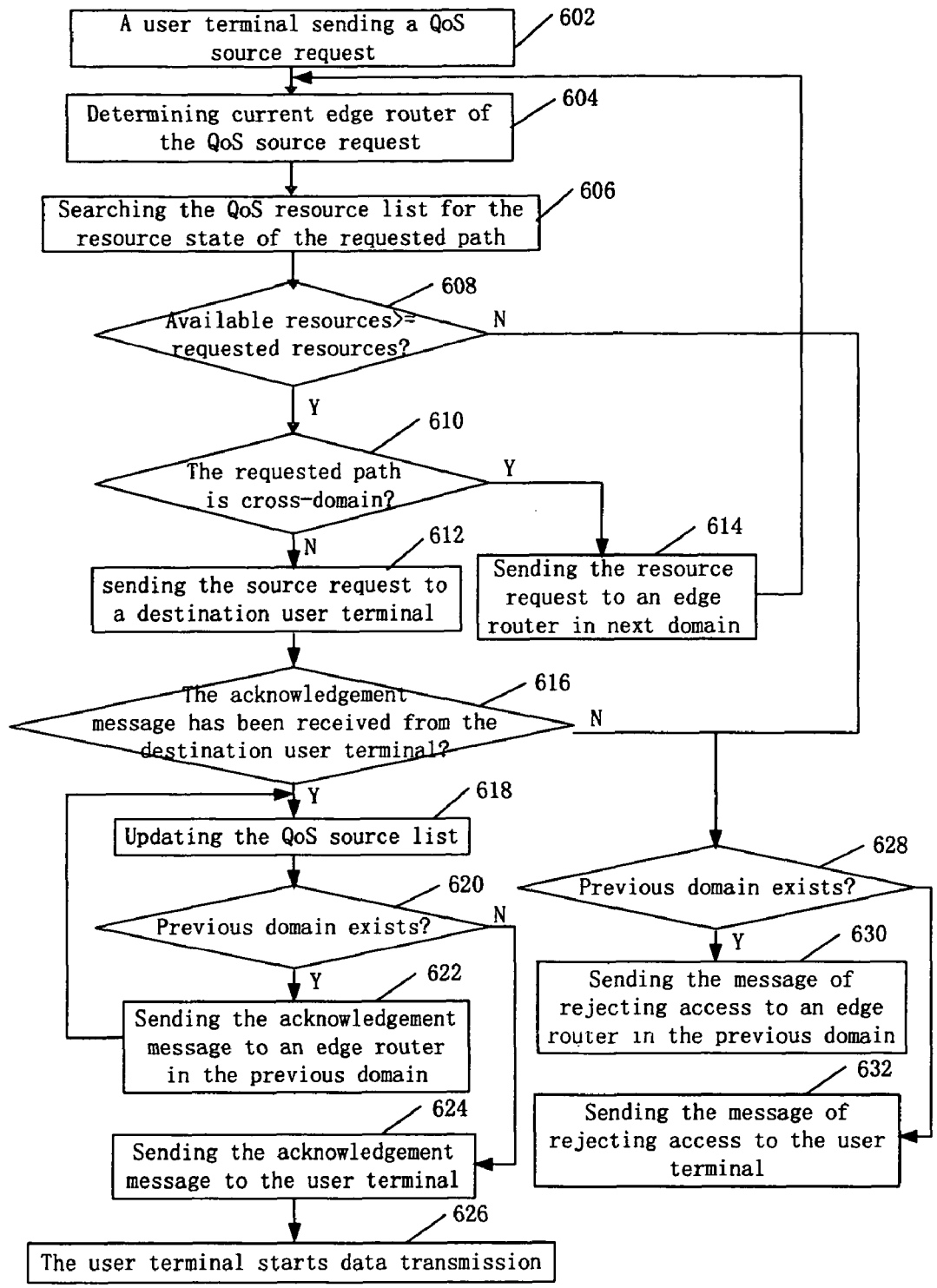
FIG. 6 is a flowchart showing a method for establishing a QoS data path in a MPLS network according to an embodiment of the present invention.

FIG. 6 is a flowchart showing a method for establishing a QoS data path in a MPLS network according to an embodiment of the present invention. As shown in FIG. 6, in step 602, a user terminal sends a QoS resource request to an ingress edge router. The user terminal sends a QoS signaling to a network device for requesting QoS resources through QoS API. The resource request carries the required service class and resource request, wherein a method for expressing the priority of the service class is predetermined between a network operator and the user terminal and between the network operators.

In step 604, the ingress edge router determines information of a path to an egress edge router of the QoS resource request. After receiving the resource request, the ingress edge router obtains a destination IP address carried in the resource request for determining an edge router through which the path leaves the domain, so as to determine the egress edge router.

In step 606, based on the egress edge router obtained in step 604, the ingress edge router searches the QoS resource list for current resource state corresponding to the path to obtain available bandwidth resources BW of the path. In this embodiment, the resource states of the paths from the edge router to all the other edge routers in the same domain are recorded in the QoS resource list. If there are N edge routers in the domain, the resource states of the paths from the edge router to the other N−1 edge routers are saved in the QoS resource list of each router.

In step 608, the ingress edge router compares the available bandwidth resources BW of the path with the bandwidth resources BWRequest requested in the resource request to determine whether the available bandwidth resources BW are larger than or equal to the requested bandwidth resources BWRequest, whereby determining whether the resource request is accessed or rejected. If the result in step 608 is that the available bandwidth resources are larger than or equal to the requested bandwidth resources, the process proceeds to step 610. Otherwise, the process proceeds to step 628, where a message of rejecting access is sent to the user terminal which requests the resources.

In step 610, it is determined whether the path for the resource request is cross-domain. If the result in step 610 is "Yes", the process proceeds to step 614. In step 614, the ingress edge router sends the resource request to an edge router of next domain and the process returns back to step 604. From step 604 on, the edge router of the next domain performs access control based on the resource state of the next domain. If the resource request is also allowed to be accessed, the resource request is sent to an edge router of further next domain or directly to the destination user terminal if there is not any next domain; otherwise a message of rejecting access is sent to the edge router of the previous domain. If the edge router of the next domain or the destination user terminal returns an acknowledgement message, the edge router of this domain sends an acknowledgement message of allowing access to the edge router of the previous domain or the user terminal which makes the request, and updates its QoS resource list. If the edge router of the next domain or the destination user terminal sends a message of rejecting access, the edge router of this domain sends the message of rejecting access to the edge router of the previous domain or the user terminal which makes the request.

If the result in step 610 is "No", the process proceeds to step 612. In step 612, the edge router sends the resource request to the destination user terminal directly, and waits for an acknowledgement message from the destination user terminal. Thereafter, the process proceeds to step 616.

In step 616, it is determined whether the edge router has received the acknowledgement message of allowing access from the destination user terminal. If the result in step 616 is "Yes", the process proceeds to step 618. In step 618, the ingress edge router updates its QoS resource list. Specifically, the bandwidth resources requested in the resource request are subtracted from the available resources corresponding to the path in the QoS resource list, that is, the available bandwidth resources BW=the available bandwidth resources BW−the requested bandwidth resources BWRequest. Then, the process proceeds to step 620. In step 620, it is determined whether the domain has the previous domain. If the result in step 620 is "Yes", that is, the domain has the previous domain, the edge router sends an acknowledgement message to the edge router of the previous domain. Then, the process returns back to step 618.

If the result in step 620 is "No", that is, the domain has no previous domain, the edge router sends an acknowledgement message of allowing access directly to the user terminal which requests the resources. Then, in step 626, the user terminal which requests the resources starts the data transmission.

If the result in step 616 is "No", the process proceeds to step 628, where it is determined whether the domain has the previous domain. If the result in step 628 is "Yes", that is, the domain has the previous domain, the edge router sends a message of rejecting access to the edge router of the previous domain. Then the process returns back to step 628. If the result in step 628 is "No", that is, the domain has no previous domain, the edge router sends a message of rejecting access directly to the user terminal which requests the resources.

It should be understood that in the case that a user terminal requests for data transmission in a local domain of the MPLS network, the process of establishing a QoS data path for the user terminal is the process comprising steps 602, 604, 606, 608, 612, 616, 618, 624, 626 and 632 in the flowchart of FIG. 6, omitting the determination of cross-domain and other related processes realized by the other steps.

A Method for Terminating QoS Data Transmission in a MPLS Network

Figure 7:
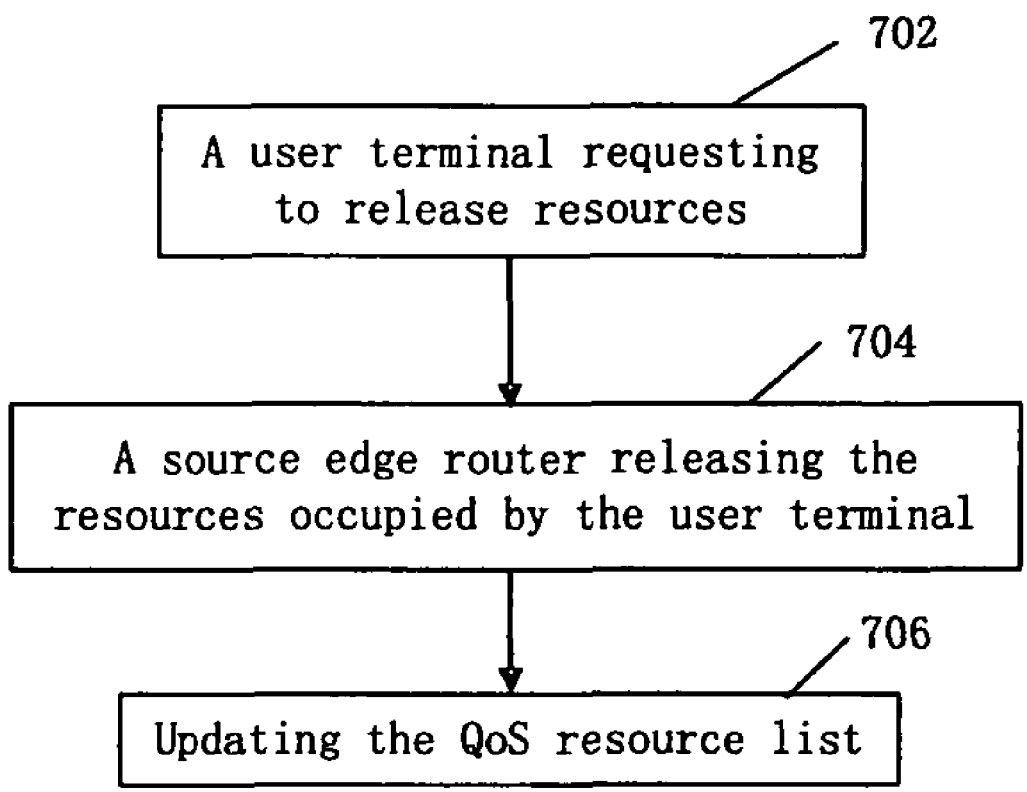
FIG. 7 is a flowchart showing a method for terminating QoS data transmission in a MPLS network according to an embodiment of the present invention.

FIG. 7 is a flowchart showing a method for terminating QoS data transmission in a MPLS network according to an embodiment of the present invention. As shown in FIG. 7, in step 702, an ingress edge router receives a request for releasing resources from a user terminal. The user terminal sends a QoS signaling to a network device for releasing QoS resources through QoS API, wherein the request for releasing the resources carries information of a path occupied by the resources.

In step 704, based on the information of the path, the ingress edge router releases the resources occupied by the user terminal.

In step 706, the ingress edge router modifies its QoS resource list, which records resource state corresponding to the path. In this embodiment, the resource states of the paths from the edge router to all the other edge routers in the same domain are recorded in the QoS resource list. If there are N edge routers in the domain, the resource states of the paths from each edge router to the other N−1 edge routers are saved in the QoS resource list of the corresponding router. According to this embodiment, to modify the QoS resource list is to add corresponding amount to the available QoS resources corresponding to the egress edge router of the QoS data transmission path occupied by the user terminal in the QoS resource list. That is, if the available resources corresponding to the path in the original QoS resource list are BW and the bandwidth resources of the path occupied by the user terminal are BWOccupy, the available resources corresponding to this path will be modified as the available bandwidth resources BW=the available bandwidth resources BW+the occupied bandwidth resources BWOccupy.

An Edge Router for a MPLS Network

Figure 8:
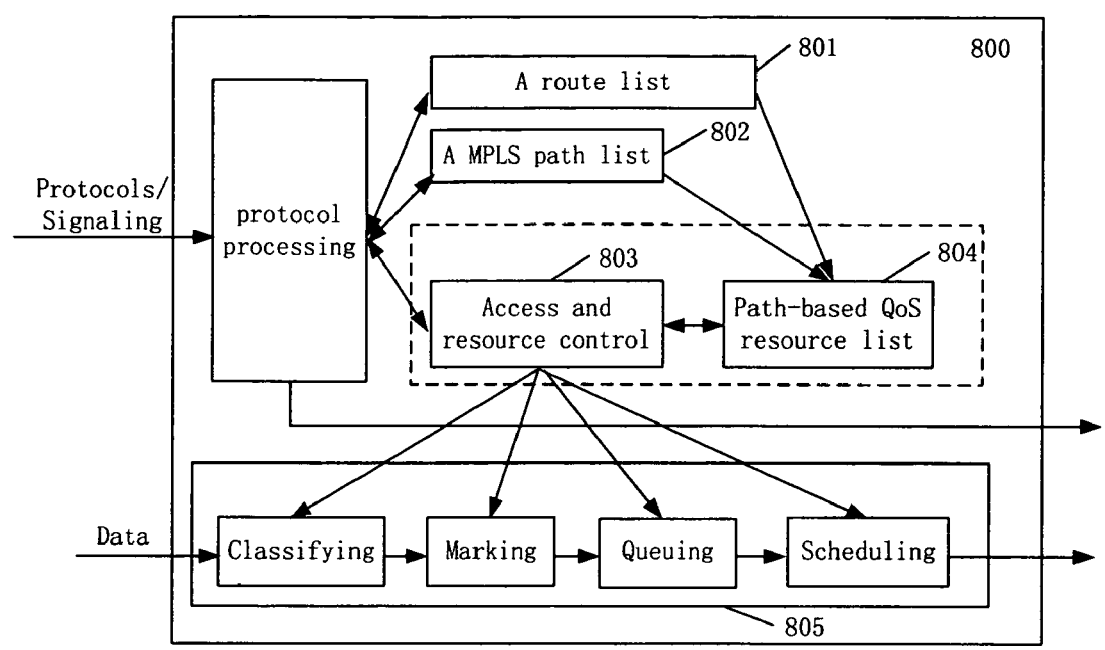
FIG. 8 is a block diagram showing an edge router for a MPLS network according to an embodiment of the present invention.

Under the same inventive concept, FIG. 8 is a block diagram showing an edge router for a MPLS network according to an embodiment of the present invention. As shown in FIG. 8, the edge router for a MPLS network according to this embodiment includes: a QoS resource list 804 for recording resource state corresponding to a path; an access and resource control unit 803 for accessing or rejecting a resource request from a user terminal according to information recorded in the QoS resource list and updating the QoS resource list; a route list 801 and a MPLS resource list 802 based on which the QoS resource list 804 is created and corresponds to LSP resource state of the MPLS network; a data transmission unit 805 which, under the control of the access and resource control unit 803, performs operations such as classifying, marking, queuing and scheduling on the data transmitted by the user terminal.

In this embodiment, the resource states of the paths from the edge router to all the other edge routers in same domain are recorded in the QoS resource list 804. If there are N edge routers in the domain, the resource states of the paths from each edge router to the other N−1 edge routers are saved in the resource list of the corresponding router. The resource information of the paths from the router to each of the other edge routers in the same domain are obtained by organizing LSP resource state information and route information in the MPLS network and saved in the QoS resource list for providing decision basis for controlling resource assignment later. The access and resource control unit 803, as a resource control layer, performs access control on the resource request and resource assignment.

With the edge router 800 for the MPLS network in this embodiment, the methods for realizing QoS guarantee in a MPLS network and establishing and terminating QoS data transmission described in the previous embodiments may be implemented.

Specifically, in the method for realizing QoS guarantee, the edge router 800 receives the resource request from the user terminal, the access and resource control unit 803 of the edge router 800 searches the QoS resource list 804 based on the egress edge router in the resource request to obtain available information of the requested resources. Based on the available information of the requested resources, the access and resource control unit 803 determines whether the resource request is accessed or rejected, that is, the available bandwidth resources BW of the path are compared with the bandwidth resources BWRequest requested in the resource request to determine whether the available bandwidth resources are larger than or equal to the requested bandwidth resources. If "yes", the resource request is allowed to be accessed and an acknowledgement message of allowing access is sent to the user terminal, and the available information of the requested resources in the QoS resource list are modified. Otherwise, a message of rejecting access is sent to the user terminal which requests the resources. After receiving the acknowledgement message, the user terminal begins to transmit data. The data transmission unit 805, under the control and coordination of the access and resource control unit 803, performs operations such as classifying, marking, queuing and scheduling on the transmitted data.

A MPLS Network for Realizing QoS Guarantee

Figure 9:
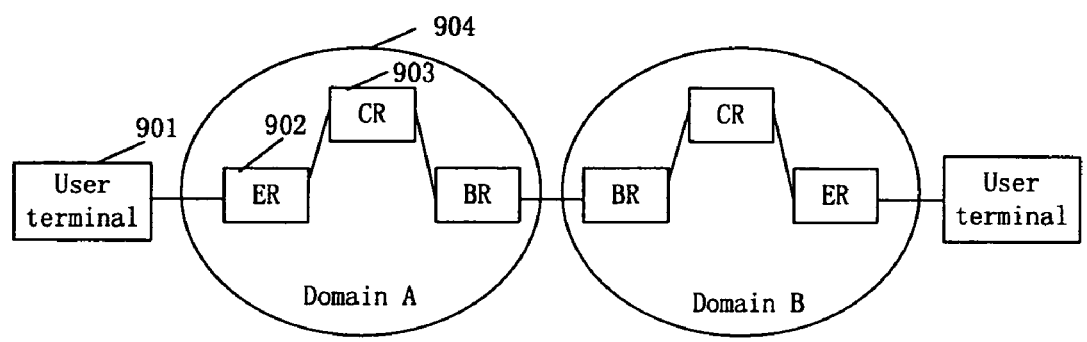
FIG. 9 is a block diagram showing a MPLS network for realizing QoS guarantee according to an embodiment of the present invention.

Under the same inventive concept, FIG. 9 is a block diagram showing a MPLS network for realizing QoS guarantee according to an embodiment of the present invention. As shown in FIG. 9, the MPLS network for realizing QoS guarantee of this embodiment includes: a user terminal 901, a core router 903, a MPLS backbone network 904 and an edge router 902 which is the above-described edge router for the MPLS network.

In the MPLS network for realizing QoS guarantee, the user terminal 901 accesses the MPLS backbone network via the edge router 902 to share the resources in the network. The edge router 902 performs access control on the resource request from the user terminal, assigns resources of the network and provides an interface for traffic control. The core router 903 provides the route control in the MPLS backbone network 904. The MPLS backbone network 904 is used to provide various services for the accessed user terminal.

The above-described edge router for the MPLS network and MPLS network for realizing QoS guarantee of the present invention and their components may be implemented in hardware and software, and may include other function modules or combine with other apparatuses if needed.

Though a method for realizing QoS guarantee in a MPLS network, a method for establishing QoS data transmission in a MPLS network, a method for terminating QoS data transmission in a MPLS network, an edge router for a MPLS network and a MPLS network for realizing QoS guarantee of the present invention have been described in details with some exemplary embodiments, these embodiments are not exhaustive, those skilled in the art may make various variations and modifications within the spirit and scope of the present invention. Thus, the present invention is not limited to these embodiments, and the scope of the present invention is only defined by the appended claims.

The invention claimed is:

1. A method for realizing Quality of Service (QoS) guarantee in a Multi Protocol Label Switching (MPLS) network, comprising:

pre-creating an individual QoS resource list in each edge router to record a resource state corresponding to a path before receiving a resource request from a user terminal, wherein the resource states of the paths from the edge router to all other edge routers in the same domain are recorded in said individual QoS resource list; and said edge router receiving the resource request from the user terminal;

said edge router searching said QoS resource list for available information of the requested resources based on an egress edge router in said resource request;

said edge router determining whether the resource request is accessed or rejected based on the available information of said requested resources;

when the resource request is determined to be accessed, modifying the available information of the requested resources in said QoS resource list and sending an acknowledgement message to said user terminal;

creating the QoS resource list further comprises:

pre-configuring label switching paths(LSPs) based on service class to set different LSPs for different service classes;

said edge router obtaining resource information of the path from the edge router to each of the other edge routers in the same domain based on LSP resource state information and route information of said MPLS network, and saving the resource information in the QoS resource list.

2. The method according to claim 1, characterized in that said QoS resource list at least comprises information of said egress edge router, service class, LSP resources and available resources.

3. A method for establishing a Quality of Service (QoS) data path in a Multi Protocol Label Switching (MPLS) network, comprising:
- a user terminal sending a QoS resource request to an ingress edge router;
- said ingress edge router determining information of a path to an egress edge router of the QoS resource request;
- said ingress edge router determining whether the resource request is accessed or rejected based on comparing available resources of the requested resources corresponding to the path recorded in a QoS resource list with bandwidth resources requested in said resource request;
- rejecting access when the available resources are less than the bandwidth resources, sending a message of rejecting access to said user terminal; and
- allowing access when the available resources are not less than the bandwidth resources, updating said QoS resource list correspondingly; and
- wherein said QoS resource list is pre-created in each edge router before receiving the resource request from the user terminal, and the resource states of the paths from the edge router to all other edge routers in the same domain are recorded in said QoS resource list;
- creating the QoS resource list further comprises:
- pre-configuring label switching paths(LSPs) based on service class to set different LSPs for different service classes;
- said edge router obtaining resource information of the path from the edge router to each of the other edge routers in the same domain based on LSP resource state information and route information of said MPLS network, and saving the resource information in the QoS resource list.

4. The method according to claim 3, characterized in that the step of allowing the user terminal to access further comprises:
- when the resource request is not cross-domain, said edge router sending the resource request to a destination user terminal in said resource request and waiting for an acknowledgement message from the destination user terminal;
- when the resource request is cross-domain, said edge router searching for a domain which is close to the destination user terminal in said resource request and has available resources larger than said bandwidth resources, sending the resource request to an edge router of the domain and waiting for an acknowledgement message from the edge router of the domain;
- after receiving the acknowledgement message, said edge router sending the acknowledgement message to said user terminal; and
- after receiving the acknowledgement message, said user terminal starts the data transmission.

5. The method according to claim 3, characterized in that the step of updating the QoS resource list further comprises:
- subtracting the bandwidth resources requested in said QoS resource request from the available resources of the corresponding requested resources in said QoS resource list.

6. The method according to claim 3, characterized in that said QoS resource list at least comprises information of the egress edge router, service class, LSP resources and available resources.

7. A method for terminating Quality of Service (QoS) data transmission in a Multi Protocol Label Switching (MPLS) network, comprising:
- an ingress edge router receiving QoS resource request from a user terminal;
- said ingress edge router searching QoS resource list for available information of the requested resources based on an egress edge router in said QoS resource request;
- said ingress edge router determining whether the QoS resource request is accessed or rejected based on the available information; and
- said ingress edge router receiving a resource releasing request from a user terminal;
- said ingress edge router releasing the resources occupied by said user terminal;
- said ingress edge router correspondingly modifying its said QoS resource list which records a resource state corresponding to a path; and
- wherein said QoS resource list is pre-created in each edge router before receiving said resource request from the user terminal, and the resource states of the paths from the edge router to all other edge routers in the same domain are recorded in said QoS resource list;
- creating the QoS resource list further comprises:
- pre-configuring label switching paths(LSPs) based on service class to set different LSPs for different service classes;
- said edge router obtaining resource information of the path from the edge router to each of the other edge routers in the same domain based on LSP resource state information and route information of said MPLS network, and saving the resource information in the QoS resource list.

8. The method according to claim 7, characterized in that the step of modifying the QoS resource list further comprises:
- adding a corresponding amount to available QoS resources corresponding to an egress edge router of said QoS data transmission in the QoS resource list.

9. The method according to claim 7, characterized in that said QoS resource list at least comprises information of an egress edge router, service class, LSP resources and available resources.

10. An edge router for a Multi Protocol Label Switching (MPLS) network, comprising:
- a Quality of Service (QoS) resource list for recording a number of resource states corresponding to a number of paths; and
- an access and resource control unit for receiving a resource request from a user terminal, searching the QoS resource list for available information of the requested resources and accessing or rejecting the requested resource based on information recorded in the QoS resource list then updating said QoS resource list correspondingly, and sending an acknowledgement message to the user terminal; and
- wherein said QoS resource list is pre-created in each edge router before receiving said resource request from the user terminal, and the resource states of the paths from the edge router to all other edge routers in the same domain are recorded in said QoS resource list;
- creating the QoS resource list further comprises:
- pre-configuring label switching paths(LSPs) based on service class to set different LSPs for different service classes;
- said edge router obtaining resource information of the path from the edge router to each of the other edge routers in the same domain based on LSP resource state information and route information of said MPLS network, and saving the resource information in the QoS resource list.

11. The edge router according to claim 10, further comprising a route list and a MPLS list based on which said QoS resource list is created and corresponds to LSP resource state of the MPLS network.

12. The edge router according to claim 10, further comprising a data transmission unit which, under the control of said access and resource control unit, performs operations such as classifying, marking, and queuing and scheduling on data transmitted by the user terminal.

13. The edge router according to claim 10, characterized in that said QoS resource list at least comprises information of an egress edge router, service class, LSP resources and available resources.

14. A MPLS network for realizing QoS guarantee, comprising:

an edge router according to claim 10.

* * * * *